United States Patent [19]

Flinn

[11] Patent Number: 4,789,015

[45] Date of Patent: Dec. 6, 1988

[54] MINI-TIRE TO WHEEL ORIENTING SYSTEM

[75] Inventor: Daniel M. Flinn, Westland, Mich.

[73] Assignee: Allied Automation Systems, Inc., Detroit, Mich.

[21] Appl. No.: 11,543

[22] Filed: Feb. 6, 1987

[51] Int. Cl.$^4$ .............................................. B60C 25/00
[52] U.S. Cl. ........................................ 141/98; 141/38; 157/1.1; 157/1.17
[58] Field of Search ..................................... 141/1–12, 141/37–68, 114, 313–317, 250–284, 129–192, 98; 157/1.1, 1.17, 1.2, 1.21, 1.26, 1.28

[56] References Cited

U.S. PATENT DOCUMENTS

| | | | |
|---|---|---|---|
| 2,648,374 | 8/1953 | Qualen | 157/1.1 |
| 2,900,018 | 8/1959 | Harrison | 157/1.1 |
| 2,907,379 | 10/1959 | Tuttle | 157/1.1 |
| 3,095,920 | 7/1963 | Cislak | 157/1.1 |
| 4,031,941 | 6/1977 | Malinski et al. | 157/1.17 |
| 4,163,468 | 8/1979 | Mueller | 157/1.17 |
| 4,506,708 | 3/1985 | Onuma | 141/4 |

Primary Examiner—Henry J. Recla
Assistant Examiner—Ernest G. Cusick
Attorney, Agent, or Firm—Basile and Hanlon

[57] ABSTRACT

Apparatus for assuring that an uninflated mini tire mounted on a wheel is coaxially centered relative to the wheel prior to the arrival of the mini tire-wheel unit at the inflation station of a tire-wheel assembly line is disclosed which the mini-tire wheel unit is being conveyed in a horizontal position from the mounter to the inflator it is subjected to a hammer blow against the tire tread and subsequently apparatus mounted along opposite sides of the conveyor vertically press against an adjacent portion of one side wall of the tire. These actions jar the tire beads loose from a partially wedged engagement within the drop well of the wheel which tends to occur during the mounting of the mini tire on the wheel and to seat one bead of the tire upon the associated bead seat of the wheel.

5 Claims, 3 Drawing Sheets

MINI-TIRE TO WHEEL ORIENTING SYSTEM

BACKGROUND OF THE INVENTION

Nearly all passenger vehicles produced in the United States utilize a so-called mini-tire as the spare tire for the vehicle. These tires are intended only for temporary emergency use and the mini-tire and its associated wheel are of reduced physical dimensions as compared to the standard tire and wheel assemblies designed for long term every day usage.

In the typical vehicle assembly plant, a tire and wheel assembly line is operated in conjunction with the vehicle assembly line to feed mounted and inflated tires to the vehicle assembly line so that the correct size and style of tire and wheel arrive at the wheel mounting station on the main assembly line at the same time the vehicle upon which they are to be mounted reaches that station. In this system, every fifth tire and wheel fed to the main assembly line will be a mini tire-wheel. Thus, the mini tire and wheel assemblies are integrated into the tire mounting and inflation line with standard size tires and wheels.

Experience has shown that, because of the dimensions of the mini-wheel and tire and the manner in which the uninflated tire is mounted upon the mini wheel, a substantial number of mini wheel-tire units arrive at the inflator with the tire off-center with respect to its wheel to the point where the inflator cannot successfully inflate the tire. On some tire-wheel lines, the success rate of inflating mini-spares was only about 40%.

The problem of non-concentric positioning of the mini tire upon its wheel arises primarily because of the fact that the axial width of the drop well of the mini wheel is not much larger than the combined axial thicknesses of the mini tire beads. During the final stage of the tire mounting process the amount the tire beads must be stretched to force them inwardly over the rim flange of the wheel will pull the already mounted portion of the beads inwardly from the bead seats into the drop well at that portion of the wheel opposite the as yet unmounted portions of the bead.

The relatively narrow drop well of the mini wheel frequently will acquire a tight enough grip on the bead portions of the mini tire forced into the drop well during the mounting operation that it will hold the mounted mini tire in an off center relationship to the wheel through its arrival at the inflator. Typically, the wheel is used to align the wheel-tire assembly with the head of the inflator, and if the tire is not concentric with the wheel inflation cannot be accomplished. Unlike the standard tire-wheel assembly, the mini tire-wheel assembly is not subjected to a rotative wheel-to-tire orientation at a station between the mounter and inflator, hence the mini tire will normally maintain the same relationship with its wheel as exists as the unit leaves the mounter.

The present invention is especially directed to this problem and solves the problem by employing two relatively simple mechanisms operable upon the mini tire-wheel assembly at stations between the mounter and inflator to assure that the mini tire is centered with respect to its wheel as the unit reaches the inflator. The system of the present invention has inreased the percentage of inflated mini spare assemblies from the 40% figure referred to above to 99%.

SUMMARY OF THE INVENTION

In accordance with the present invention, during its conveyance between the mounter and the inflator, the mini tire passes through a first station where the tire is subjected to a radially directed hammer blow against the tire tread and is subsequently, prior to its arrival at the inflator, conveyed through a second station where the mini tire is shifted vertically relative to its wheel.

Shifting of the mini tire sidewalls vertically, relative to the wheel, is accomplished by a pair of arms mounted for pivotal movement about a horizontal axis at opposite sides of the conveyor which carries the tires and wheels toward the inflator. The arms are normally held in a retracted position clear of the path of movement of standard sized tires along the conveyor, but at the approach of a mini tire-wheel assembly, are pivoted into a position such that the arms will engage the sidewall of the mini tire at opposite sides of its wheel as the horizontally disposed tire and wheel move past the arms. Dependent upon the structure employed to mount the mini wheel upon its conveyor pallet, these arms, in their retracted position, may be located either below or above the path of movement of tires along the conveyor. When located below the path, in their operative position the arms are inclined upwardly in the downstream direction of movement of articles along the conveyor and as the tire and wheel pass the arms, the mini tire rides up an inclined ramp, defined by the arms, to lift the wheel slightly above its support on the pallet. The weight of the wheel is thus supported for a short period of time by the tire and will gravitationally tend to center itself with respect to the tire. This arrangement requires a wheel to pallet mounting arrangement which includes a pin projecting upwardly from the pallet through the wheel to a height such that the wheel is not lifted off the pin during the above described procedure.

If the length of the wheel engaging pins on the pallet is insufficient for this purpose, the arms are mounted above the path of the tires and, when actuated, have their distal ends swung downwardly to engage the upper sidewall of the mini tire to force the tire downwardly on its wheel as the tire-wheel assembly passes beneath and between the arms.

It has been found that if the arms described above are employed, the inflation rate of mini spares is increased from 40 to approximately 90%.

At a location along the conveyor where the wheel-tire unit is stationary, a hammer mechanism is actuated to deliver a hammer blow against the mini tire tread at a point approximately 90° about the wheel axis from that region of the tire which tends to become trapped in the mini wheel drop well. This hammer blow will jar the trapped portion of the bead loose from the drop well.

Again, the orientation of the hammer mechanism relative to the path of movement of the tire and wheel along the conveyor is selected in accordance with the type of tire mounter employed. The two most common types of tire mounters are a so-called pull through type, and a rotary type. In the pull through type of mounter the mini tire beads tend to be trapped in that portion of the mini wheel adjacent the conveyor center line at the leading end of the wheel with respect to its direction of movement along the conveyor. In this case, the hammer blow is delivered to the tread at a location approximately 90° from the conveyor center line.

When a rotary mounter is employed, the mini tire beads tend to be trapped in the drop well at a location approximately 90° from the conveyor center line at one side or the other of the center line dependent upon the direction of rotation of the mounter head. In this case, the hammer mechanism is so located as to deliver its blow to the tread approximately at the conveyor center line at the leading end of the tire with respect to its direction of movement along the conveyor.

Other objects and features of the invention will become apparent by reference to the following specification and to the drawings.

DESCRIPTION OF THE PREFERRED EMBODIMENT

Figure 2:
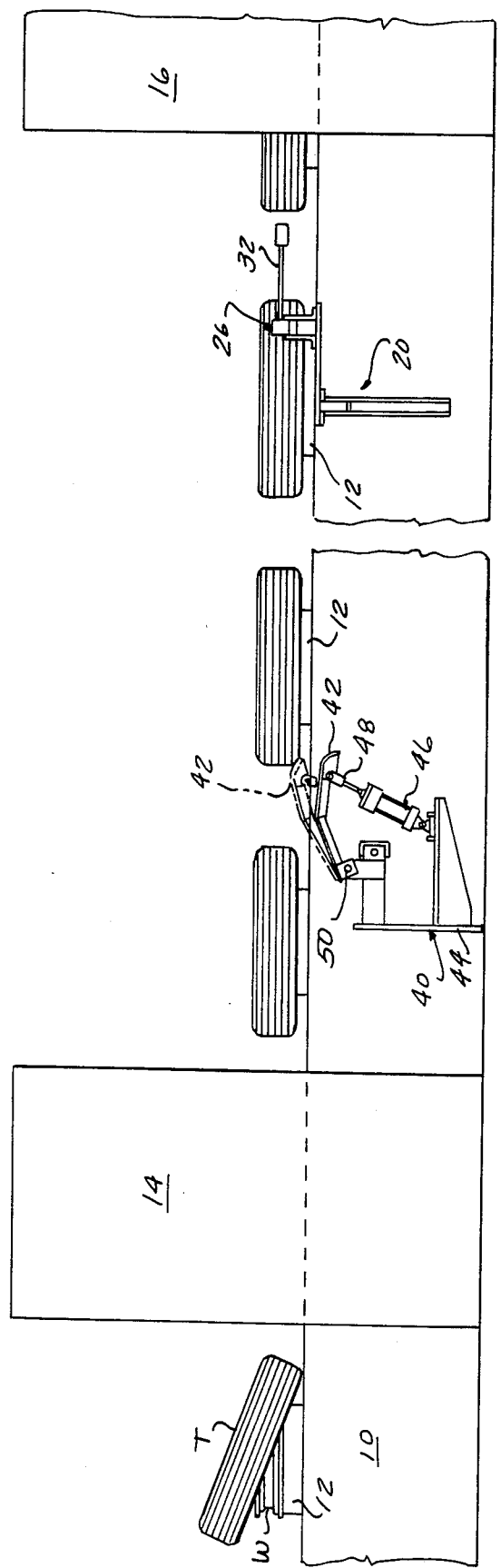
FIG. 2 is a side elevational view, partially schematic, with various parts broken away or omitted of a tire-wheel assembly and inflation line embodying the present invention.

Referring first to FIG. 2, there is shown somewhat schematically a side view of a portion of a tire-wheel assembly line provided with apparatus embodying the present invention. The line of FIG. 2 includes a pallet type conveyor designated generally 10 having a plurality of uniformly spaced wheel carrying pallets 12 which are advanced from left to right as viewed in FIG. 2 in intermittent step-by-step movement along a path in the pallets are advanced to and through various work stations. In FIG. 2, one of these work stations takes the form of a tire mounter schematically illustrated at 14, and another work station takes the form of a schematically illustrated tire inflator designated generally 16. Typically, such a line will also include, between mounter 14 and inflator 16, a tire to wheel orientor (not shown) which rotatively orients the uninflated tire upon its wheel to rotatively match up marks on the tire and wheel indicating maximum and minimum points of radial force variation or radial run out. Various other work stations may be incorporated in the line upstream of mounter 14, such as wheel and tire soapers, bore cleaners, etc. and other stations such as balancers, etc. may be associated with the line downstream of inflator 16. The line is designed to supply mounted and inflated tire and wheel assemblies in sequence to the main assembly line as required. Because present day vehicles may be optionally equipped with any of several varieties of tire sizes and wheel types and styles, the various machines on the illustrated line, such as mounter 14 and inflator 16, are designed to self adjust their operation to wheel and tire sets falling within a fairly substantial range of different dimensions, including those of the so-called mini spare which is now conventionally supplied as the fifth or spare tire-wheel assembly of each vehicle.

The conveyor pallets 12 are conventionally provided with upwardly projecting pins or locator devices (not shown) which will hold a wheel mounted on the pallet in a horizontal position against displacement in any direction horizontally relative to the pallet. Wheels W are loaded, one onto each pallet, onto the pallets at a location upstream from the mounter 14 and tires T are loaded onto each pallet mounted wheel in a rearwardly slanted position illustrated at the pallet 12 to the left of mounter 14 in FIG. 2. In this slanted position, the beads at the leading end of the tire, with respect to its direction of movement along conveyor 10, project into the space between the rim flanges of the wheel at the leading end of the wheel and the tire is supported in the slanting position by the engagement of its lower bead with two points on the upper rim of the wheel at opposite sides of the conveyor center line. The wheel and tire in this relationship are then advanced by the conveyor into mounter 14 where the mounter will successively press those portions of the beads which are above the upper wheel rim downwardly below and beneath the upper rim of the wheel W until both beads of the tire T are trapped between the rim flanges of the wheel. The mounted tire and wheel are then advanced by conveyor 10 in step-by-step movement to inflator 16 which operates, in a well known manner, to inflate the mounted tire to complete the tire-wheel assembly. Both standard sized tire and wheel assemblies and mini-spare assemblies pass through the same mounter and inflator.

Since the advent of the mini spare, commercially available inflators have been designed to be capable of handling both standard road type tires and mini spares not only by self adjusting the machine to accommodate the dimensional differences, but also to supply the correct inflation pressure which is much higher for mini spares than for standard road tires. However, these inflators require that the tire and wheel be centered, relative to each other, as they are received by the inflator. If the tire and wheel are not centered with respect to one another, the tire cannot successfully be inflated by the inflator.

One of the justifications for the mini spare is that its reduced overall dimensions require a storage compartment in the vehicle of correspondingly reduced dimensions. However, as a practical matter, to maintain an adequate seal between the tubeless mini tire and its wheel, the dimensions of the mini tire bead and bead seat on the wheel must be substantially the same as those of standard tires and wheels. As such, the reduction in the axial width of the mini wheel is primarily achieved by reducing the axial width of its drop well.

Figure 1:
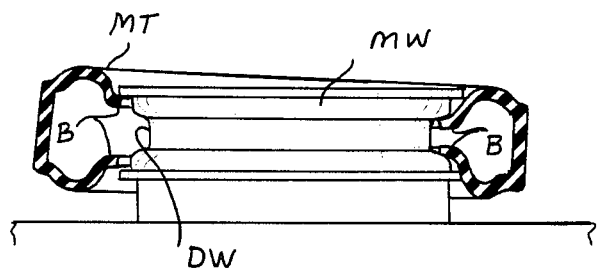
FIG. 1 is a side view of a mini tire-wheel, with the tire shown in section, showing the tire trapped in a non-concentric relationship with the wheel.

Referring now to FIG. 1 there is shown a mini wheel MW with a mounted mini tire MT shown in cross section illustrating a problem which arises in the mounting process which results in the mini tire being positioned and held in an off center position relative to its wheel. The designed reduction in the axial width of the mini wheel MW results in a substantial reduction in the axial width of the concave annular drop well DW of the wheel to the point where, as shown in FIG. 1, the axial width of the drop well is only slightly greater than the combined thickness of the beads B of mini tire MT.

Because the opening in the tire (the diameter of the inner periphery of the bead) must be smaller than the outer diameter of the wheel rim over which the beads are to be forced in the mounting process, the tire beads must be stretched during the mounting process. The amount of stretching required is alleviated to some extent by the fact that those portions of the beads which have already been forced over the rim can move radially inwardly to the bead seat and beyond the bead seat into the drop well. The stretching force applied to the tire increases progressively as the beads in turn are progressively forced past the rim, and reaches a maximum as the final portions of the beads are forced past the rim. During the final portions of the bead mounting process, a substantial tension is exerted on the beads which draws the mounted portions of the beads directly opposite the as yet unmounted portions tightly into the drop well of the wheel. In the case of mini tires, the reduced axial width of the mini wheel drop well frequently will result in those portions of the beads opposite the last mounted portions of the beads being wedged fairly firmly into the drop well in the fashion illustrated at the right-hand side of FIG. 1. When held in this relationship, the mini tire MT is off center with respect to its wheel to the point where it cannot be successfully inflated by the inflator.

Experience has shown that some tire lines which operate with mini spares interspersed between standard tire-wheel assemblies were successful in inflating only approximately 40% of the mini spares which passed through the line. This situation required manual inspection and manual adjustment of off center mini tires upon their wheels.

The present invention solves this problem by manipulating devices which will properly position an uninflated mini tire mounted upon a wheel to achieve an inflation rate of nearly 100%.

Returning now to FIG. 2, at a suitable location along conveyor 10, a bead seating mechanism designated generally 40 is mounted at opposite sides of conveyor 10. Again, the orientation of bead seating mechanism 40 may vary in accordance with the structure employed to locate the mini wheel upon its pellet. In one form of locator, a relatively long vertical locating pin fixedly mounted on the pallet passes upwardly through a bore in the mini wheel. Where such a long locating pin is used, mechanism 40 may be located in the orientation shown in FIG. 2. In the FIG. 2 orientation, actuation of mechanisms 40 swings arm 42 of the mechanism into the upwardly inclined position indicated in broken line in FIG. 2 so that the two bead seating mechanisms 40, on opposite sides of the conveyor, define a forwardly and upwardly inclined ramp up which the tire of the mini tire-wheel unit must ride as it moves to the right along conveyor 10.

The height of this "ramp" is such that the mini tire is lifted upwardly a sufficient distance such that the tire in turn lifts the associated wheel upwardly clear of support from its underlying pallet. The relatively long locating pin, referred to above, projects upwardly from the pallet a sufficient distance to remain engaged within its bore in the mini wheel throughout this lifting movement. With the weight of the wheel now supported upon the upper tire bead, the wheel will tend to gravitationally shift, if necessary, until the upper bead of the tire is seated against the uppermost bead seat of the wheel, thus centering the tire relative to the wheel.

The arm 42 is mounted upon a mounting bracket 44 fixedly secured to the conveyor frame. A fluid pressure actuated motor 46 is mounted upon bracket 40 with its piston rod 48 pivotally connected to arm 42 to drive the arm between the full line and broken line position shown in FIG. 2. The arms 42 at opposite sides of conveyor 10 are located to pivot about a common horizontal axis 50 normal to the conveyor center line and the arms are symmetrically disposed at opposite sides of the conveyor center line and spaced from the center line by a distance greater than the outer diameter of the mini wheel MW and less than the outer diameter of the mini tire MT.

Figure 3:
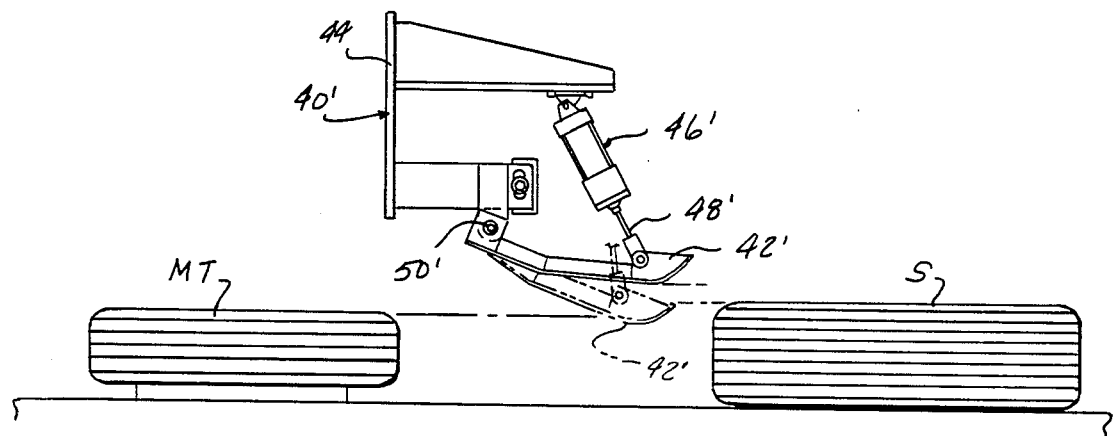
FIG. 3 is a detailed side elevational view, with certain parts omitted, showing one form of tire shifting apparatus employed in the system of the present invention.

In FIG. 3, an alternative orientation of the mechanism 40 is indicated at 40'. This orientation is employed when the locating pins on the mini wheel pallet are too short to maintain engagement with the mini wheel if the mini wheel is lifted from the pallet. Like reference numerals with a prime indicate corresponding parts between the arrangement of FIG. 2 and that of FIG. 3. The motor 46' of the FIG. 3 arrangement is operable to selectively position the arm 42' either in the inoperative position shown in full line or in the operating position indicated in broken line in FIG. 3. When elevated in the inoperative position shown in FIG. 3, arm 42' will clear standard sized tires S passing along the conveyor. When arm 42' is positioned by motor 46' in its downwardly inclined operating position, it is located in the path of mini tires passing along the conveyor and will engage and press down the upper side wall of the mini tire as it passes beneath the arm. As in the previously described arrangement in FIG. 2, arms 42' are located at opposite sides of the conveyor symmetrically spaced from the conveyor center line to permit the wheel of the mini tire-wheel unit to pass freely between the arms while engaging opposed portions of the upper sidewall of the mini tire to forcibly press the side wall downwardly. This pressing action acts to seat the lower bead of the mini tire on its seat to center the tire relative to its wheel.

It is not desired that mechanisms 40 or 40' act on standard sized tires passing along the conveyor and a suitable detector will be located upstream of mechanism 40 or 40' to permit actuation of mechanism 40 or 40' only when a mini tirewheel unit arrives at the mechanism.

Figure 4:
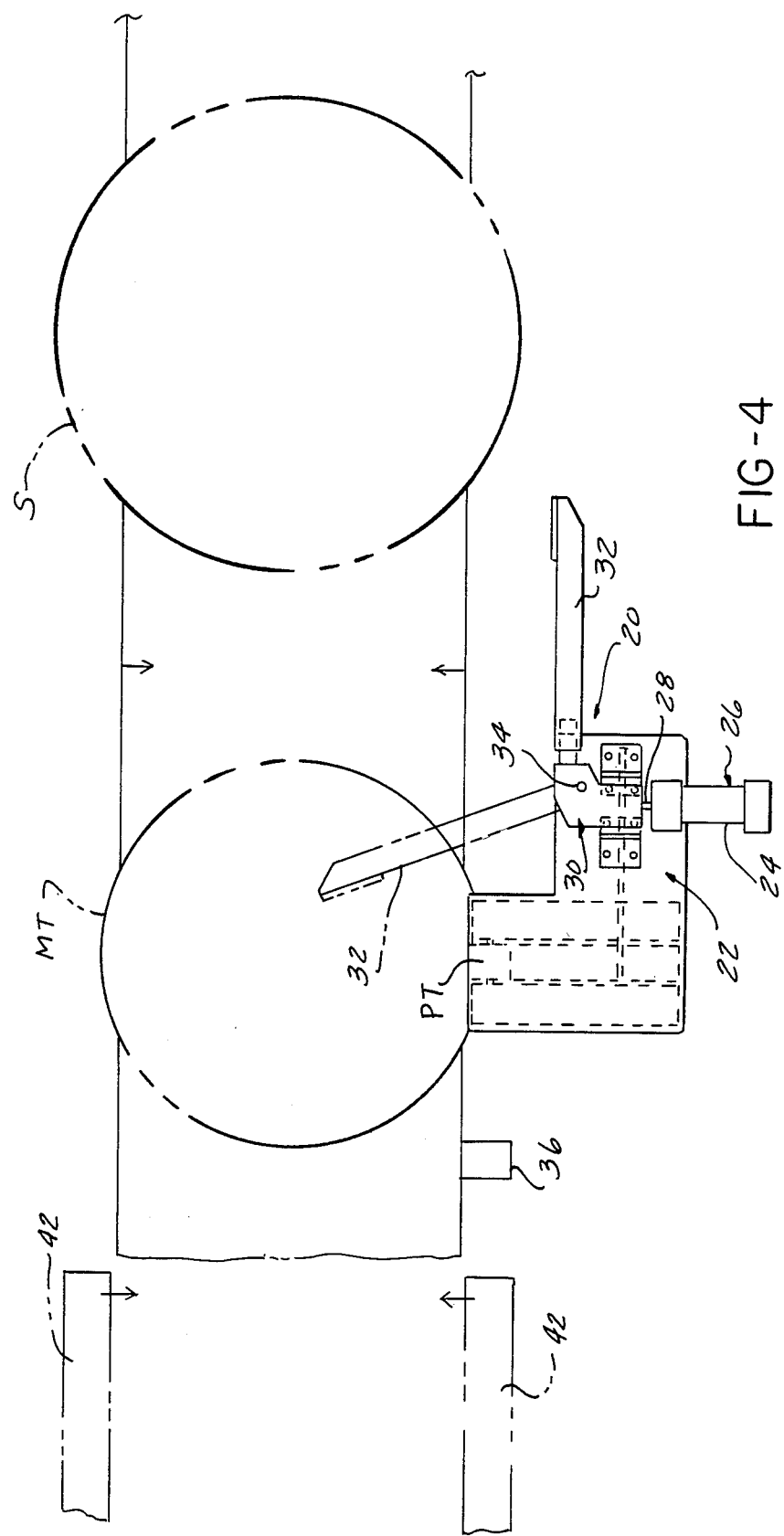
FIG. 4 is a top plan view of one embodiment of a hammer mechanism employed in the system of the present invention.

At a suitable location on conveyor 10 downstream from mounter 14, a hammer device designated generally 20 is mounted at one side of the coveyor. Details of device 20 are best seen in FIG. 4. The device 20 includes a suitable frame designated generally 22 which is fixedly mounted on the conveyor frame at one side of the coveyor. A cylinder 24 of a fluid pressure operated motor designated generally 26 is fixedly mounted on frame 22 and a piston rod 28 of motor 26 is coupled, by means of a commercially available die clamp mechanism designated generally 30 to one end of an elongate hammer arm 32. Die clamp mechanism 30 consists basically of a linkage arrangement which couples the piston rod 28 to arm 32 in a manner such that a relatively short straight line movement of piston rod 28 will swing arm 32 in pivotal movement of slightly over 90° about a vertical pivot axis at 34.

The location and orientation of hammer mechanism 20 relative to the conveyor is matched to the conveyor and to the type of mounter 14 employed on the assembly line. Conveyor 10 is driven in intermittent step-by-step movement with a time delay between successive steps of movement so that a work operation may be performed on a tire-wheel unit at the various work stations between successive steps of movement of the conveyor. Hammer mechanism 20 is so located as to constitute a work station and to deliver one or more hammer blows to the tread portion of the tire, of a tire-wheel unit, held stationary at the hammer mechanism station between successive steps of movement of the conveyor.

The objective of striking a hammer blow to the tire tread is to jar loose those portions of the tire beads which may be trapped or held within the drop well of the wheel and thus, delivery of the hammer blow to the location at which the beads are likely to be trapped is to be avoided. As described above, the location at which this trapping action may occur circumferentially of the tire is dependent upon the type of mounter employed. With a rotary type mounter, the trapping action will tend to occur near one side or the other of the tire with respect to the conveyor center line, and the hammer assembly is shown in FIG. 4 oriented for use on a line employing such a rotary mounter.

If the mounter emloyed is of the pull through type, the circumferential location at which the bead wedging action illustrated in FIG. 1 would occur is precisely at the point where the hammer orientation of FIG. 4 would deliver the hammer blow. In this case, the tendency would be to more firmly seat the tire in its off center position. Where a pull through type mounter is employed, the frame 22 of the hammer mechanism would be mounted at a location to the left of that shown in FIG. 4 with the motor-die clamp assembly and hammer arm re-oriented in a clockwise direction 90° from the orientation shown in FIG. 4 and so located on the frame 22 as to cause the hammer to strike the tread at the location PT in a direction radially of the wheel axis.

With either type of location and orientation of hammer mechanism 20, the top of frame 22 must be located below the path of movement of the tires along the conveyor and the hammer mechanism and its arm, when in the inoperative position shown in full line in FIG. 4, must be so located as to be clear of the path of movement of all tires which will be handled on the assembly line.

It is conventional in this type of line to handle both standard size tires and mini tires with mini tires interspersed along the line between standard size tires. A standard sized tire is indicated at S, at the next forward work station in FIG. 4, on the conveyor line. It will be noted that the length of arm 32 and its location must be such that the arm will clear the next adjacent tire-wheel unit during its pivotal movement. Because it is not desired to have the hammer blow delivered to standard sized tires passing along the line, a detector schematically indicated at 36 will be mounted on the conveyor just upstream of the hammer mechanism to permit actuation of the hammer mechanism only when a mini tire-wheel unit is advanced to the hammer mechanism station.

Experience with the hammer mechanism and sidewall engaging mechanisms described above has shown that usage of these two mechanisms together will enable a tire and wheel assembly line to achieve a 99% inflation rate of mini tire-wheel units passing through the line. If either of mechanism 20 or 40 is disabled, it is found that the inflation rate of mini tires will drop to about 90%.

Although the line is illustrated with sidewall engaging mechanism 40 located upstream of the hammer mechanism, the locations of the two mechanisms may be reversed if desired.

While various embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

I claim:

1. In a tire-wheel assembly line including a mounting station cyclically operable to mount an uninflated tire upon a wheel to repeatedly produce individual tire wheel units and conveying means for conveying said units in succession, in a horizontal position, along a fixed path from said mounting station to an inflation station cyclically operable to inflate the tire of each successive unit upon its wheel;

the improvement comprising centering means for coaxially centering the mounted and uninflated tire upon its wheel prior to its arrival at said inflation station, said centering means comprising a first station having a first means on said fixed path actuable to strike a hammer blow, directed generally radially of the axis of a tire wheel unit at said first station, at a preselected location against the tread of the tire of said unit, circumferentially of the tire, and a second station having a second means on said fixed path actuable to engage one side wall of the tire of a unit being conveyed past said second station at locations on said tire symmetrically disposed adjacent opposite sides of said fixed path to vertically shift said sidewall relative to its wheel as the tire and wheel are conveyed past said second station.

2. The invention defined in claim 1 wherein said second means comprises a pair of arms mounted for pivotal movement about a horizontal axis normal to said path, power actuated means for selectively positioning said arms about said axis in either of a normally maintained first position wherein said arms are clear of the path of movement of tire-wheel units along said conveyor and a second position wherein said arms are horizontally inclined from said axis into the path of movement of tires of tire-wheel units along said conveyor, said arms extending parallel to said fixed path and being spaced horizontally from each other on said horizontal axis by a distance greater than the diameter of a wheel and less than the outer diameter of a tire, and control means responsive to the approach of a selected tire wheel unit to said second station for causing said power actuated means to shift said arms from said first position to said second position and to maintain said arms in said second position until said selected tire wheel unit has been conveyed beyond said second station.

3. The invention defined in claim 2 wherein said horizontal axis is disposed below said fixed path and said arms, when in said second position, define an upwardly inclined ramp operable to elevate and support the tire of said selected tire-wheel unit as it is conveyed past said arms.

4. The invention defined in claim 2 wherein said horizontal axis is disposed above said fixed path and said arms, when in said second position, are operable to vertically depress the upper sidewall of the tire of said selected tire-wheel unit, relative to its wheel, as said selected tire-wheel unit is conveyed past said arms.

5. The invention defined in claim 1 wherein tire-wheel units of standard size and smaller than standard size tire-wheel units are produced at said mounting station and conveyed in a predetermined sequence to said inflation station; said centering means further comprising means for controlling the actuation of said first means and said second means operable to actuate said first and second means only when a smaller than standard size tire-wheel unit is presented to the respective first and second means.

* * * * *